(12) United States Patent
Carlson et al.

(10) Patent No.: US 8,500,006 B2
(45) Date of Patent: Aug. 6, 2013

(54) GIFT CARD PURCHASING SYSTEM

(75) Inventors: Mark Carlson, Half Moon Bay, CA (US); Ben Rewis, Oakland, CA (US)

(73) Assignee: Visa International Service Association, San Francisco, CA (US)

( * ) Notice: Subject to any disclaimer, the term of this patent is extended or adjusted under 35 U.S.C. 154(b) by 197 days.

(21) Appl. No.: 12/853,175

(22) Filed: Aug. 9, 2010

(65) Prior Publication Data

US 2011/0036906 A1 Feb. 17, 2011

Related U.S. Application Data

(60) Provisional application No. 61/233,790, filed on Aug. 13, 2009.

(51) Int. Cl.
*G06Q 40/00* (2012.01)

(52) U.S. Cl.
USPC .......................................... 235/379

(58) Field of Classification Search
USPC .......................................... 235/379
See application file for complete search history.

(56) References Cited

U.S. PATENT DOCUMENTS

| | | | |
|---|---|---|---|
| 5,903,881 A | 5/1999 | Schrader et al. | |
| 5,960,411 A | 9/1999 | Hartman et al. | |
| 6,615,189 B1 * | 9/2003 | Phillips et al. | 705/41 |
| 2002/0026359 A1 | 2/2002 | Long et al. | |
| 2002/0038289 A1 | 3/2002 | Lawlor et al. | |
| 2002/0056091 A1 | 5/2002 | Bala et al. | |
| 2006/0080243 A1 | 4/2006 | Kemper et al. | |
| 2006/0293959 A1 | 12/2006 | Hogan | |
| 2008/0091530 A1 * | 4/2008 | Egnatios et al. | 705/14 |
| 2009/0070258 A1 | 3/2009 | Nguyen et al. | |

FOREIGN PATENT DOCUMENTS

| | | |
|---|---|---|
| JP | 2009-055127 A | 3/2009 |
| KR | 10-2002-0003128 A | 1/2002 |
| WO | WO 99/18533 A1 | 4/1999 |
| WO | WO 03-050737 A1 | 6/2003 |

OTHER PUBLICATIONS

The International Search Report for Application No. PCT/US2010/044867, dated Mar. 31, 2011, 5 pages.
The Written Opinion for Application No. PCT/US2010/044867, dated Mar. 31, 2011, 5 pages.

* cited by examiner

*Primary Examiner* — Christle Marshall
(74) *Attorney, Agent, or Firm* — Kilpatrick Townsend & Stockton LLP

(57) ABSTRACT

In a disclosed embodiment, a bill pay system presents a bill payment interface having an area for presenting bill payment details. The bill payment interface includes the display of one or more offers for purchase of gift cards. The one or more offers for purchase of gift cards may be determined based on merchants identified in the bill payment details. The bill payment details may be updated to reflect a purchase of an offered gift card.

26 Claims, 4 Drawing Sheets

GIFT CARD PURCHASING SYSTEM

CROSS-REFERENCES TO RELATED APPLICATIONS

This application claims priority from U.S. Provisional Application 61/233,790 filed Aug. 13, 2009 and is fully incorporated herewith in its entirety for all purposes.

BACKGROUND

Gift cards (and pre-paid cards) for use by consumers in consumer transactions are typically issued by and for a particular merchant. For example, Apple, Inc. may issue, at an Apple store and upon direct and immediate payment by a consumer, gift cards for use by the consumer or others in the same or different Apple stores. Gift cards for a merchant may also be purchased on the merchant's website. For example, Apple, Inc. may have an online store at which, upon direct and immediate payment by a consumer, gift cards may be purchased for use in Apple stores.

Accordingly, the purchasing of gift cards is often limited to visiting the physical store or online store of the merchant for which the gift card is applicable to. Creating additional sales channels would increase the transaction flow on desired issuer cards resulting in increased revenue. Merchants would experience increased sales from the gift cards. Payment processors also benefit from increases in transaction revenue due to increases in pre-paid card sales volumes.

These and other challenges are addressed by embodiments of the invention, individually and collectively.

BRIEF SUMMARY

In an embodiment, a method for facilitating the purchase of gift cards includes receiving transaction information identifying a consumer. Bill payment details may be displayed on a display device based on the consumer's transaction information. Based at least on the consumer's transaction information, one or more offers for purchase of gift cards may be displayed in addition to the bill payment details. In an embodiment, a purchased gift card may be sent via ground-based delivery to a recipient of the gift card. In an embodiment, a purchased gift card may be transmitted electronically to the recipient. The recipient may be the consumer or a person or persons other than the consumer.

In an embodiment, the consumer's transaction information may identify one or more merchants. The one or more offers of gift cards may include gift cards offered by one of the identified merchants. In an embodiment, the one or more offers of gift cards may include gift cards offered by competing merchants. In an embodiment, the offers of gift cards may include gift cards for purchase of services or goods offered by an identified merchant other than those purchased by the consumer.

These and other embodiments of the invention are described in further detail below.

DETAILED DESCRIPTION

The foregoing disclosed embodiments for purchasing gift cards (i.e., pre-paid cards, cardholders certificates, and the like) are provided herein that overcome the deficiencies of conventional gift card purchase techniques. The disclosed embodiments may be incorporated into various card issuer websites or other web-based services that provide bill payment capability to consumers.

Figure 1:
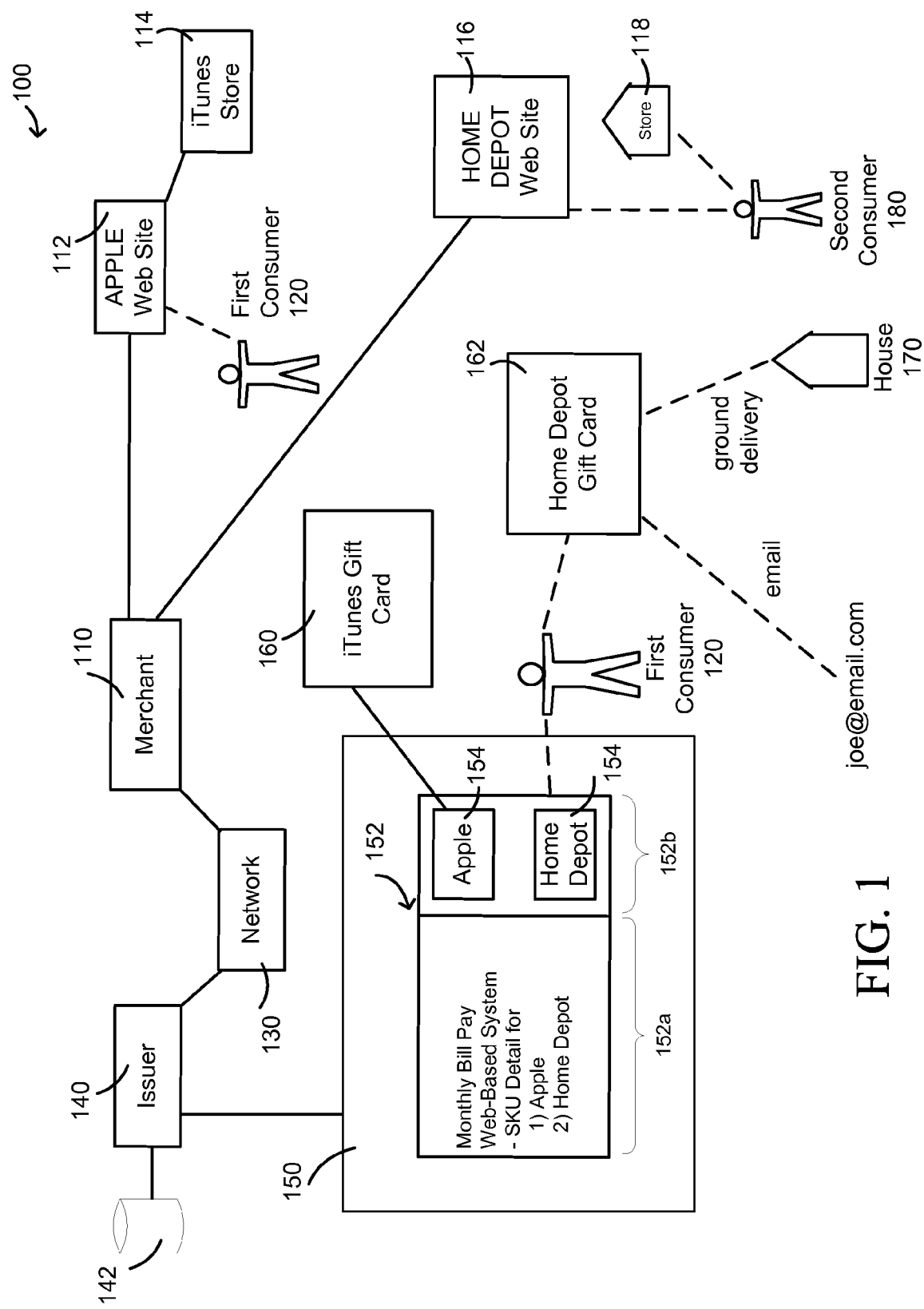
FIGS. 1 and 1A show examples of a system for facilitating the purchase of gift cards in accordance with the present invention.

FIG. 1 illustrates an embodiment of a system 100 for facilitating the purchase of gift cards in accordance with the present invention. A merchant 110 provides products or services to a first consumer 120. The merchant 110 may provide the products or services via either a physical ("brick and mortar") store or an online web site. For example, the merchant 110 may be Apple, Inc. which provides an Apple website 112 having an iTunes online store 114. As another example, the merchant 110 may be Home Depot, Inc. which provides a Home Depot website 116 and/or a Home Depot brick and mortar store 118. In general merchant 110 may represent one or more merchants providing goods and/or services, either via physical stores or via online websites.

A card issuer 140 may interact with the merchant 110 via a payment processing network 130 for transaction processing. For example, MasterCard has its Global Technology and Operations organization for transaction processing and Visa has its VisaNet system. The card issuer 140 issues portable consumer devices, such as credit cards, pre-paid gift cards, and the like, to consumers such as the first consumer 120. The first consumer 120 may use an issued credit card to conduct transactions with the merchant 110. For example, the first consumer 120 may purchase a product from the Apple website 112 or the iTunes online store 114 using the issued credit card.

A conventional transaction processing sequence may be used to process the purchase of product (goods and/or services) from a merchant 110 by the consumer 120.

When a merchant makes a sale and swipes a consumer's credit card, certain information may be communicated. For example, the card issuer 140 may receive information from the merchant 110 via the payment processing network 130 identifying the first consumer 120. Additional information such as information identifying the issued credit card, information identifying the merchant 110, information identifying a transaction amount, and so on may also be sent. The information identifying the merchant 110 may include information such as stock-keeping unit (SKU) information for the purchased item. From the payment processing network 130, the transaction goes to the issuer 140 which then checks the account and verifies the customer has adequate credit to cover the purchase. The issuer 140 then sends the merchant 110 an authorization response over the network thus completing the sale.

A web-based bill pay system 150 may be used to facilitate bill payment activity performed by the consumer. Generally, a bill payment system is an internet-based billing service that allows consumers to pay credit card bills and other retail bills from a personal computer or mobile device. Typically, funds are deducted electronically from the consumer's checking account and cleared through the Federal Reserve's Automated Clearing House (ACH) network.

Many banking institutions provide their own web-site as a service to their customers. However, institutions other than banks also provide such services. For example, CheckFree Web is an internet-based service that lets the consumer pay bills online, allowing the consumer to pay anyone that can normally be paid by check of automatic debit. Another example of a bill paying system is disclosed in U.S. Publication No. 2002/0038289 and is incorporated herein in its entirety for all purposes.

In an embodiment, the bill pay system 150 may be a service provided on behalf of the issuer 140 to facilitate payment of charges made by a consumer against a portable consumer device (e.g., credit card) issued by the card issuer to the consumer.

In another embodiment the bill pay system 150 may be provided on behalf of a bank 140a with which the consumer has a checking account, which might not be issuer 140. In one embodiment, the financial institution (e.g., 140 or 140a) may develop and support its own bill pay system 150. In another embodiment, a third party vendor (e.g., CheckeFree Web) may develop and support a bill pay system 150 in collaboration with the financial institution (e.g., 140, 140a).

Bill pay system 150 comprise one or more computer program components executing on a computer system. The bill pay system 150 may include access to a data storage subsystem 142 that stores information concerning transactions made by or made on behalf of the consumer (referred to herein generally as "billing information"). For example, the consumer may make a purchase of a good using his issued credit card. An example of a transaction made on behalf of the consumer might be the monthly telephone bill that a consumer receives.

In an embodiment, the bill pay system 150 may store in the data storage subsystem 142 information for identifying consumers, identifying issued credit cards, identifying merchants, identifying transaction amounts, etc. The information stored by the bill pay system 150 may be for a current billing month and/or previous billing months. The information identifying merchants need not only be merchants for which a consumer has entered into transactions with. Rather, other merchant identifying information may be stored as well, such as preferred merchants.

The bill pay system 150 may provide a web page that presents a bill payment interface 152 to the consumer. The bill payment interface 152 may, after allowing a consumer (e.g., first consumer 120) to log in to the bill pay system 150, present at least some of the billing information as bill payment details in one area 152a of the bill payment interface. The bill payment details may include current and/or previous monthly billing information for the consumer based on a credit card issued to the consumer 120. The bill payment details may identify the merchants with whom the consumer 120 has entered into transactions with over the monthly period using the credit card. More generally, the bill payment details may identify a "biller" which is an entity from whom the consumer 120 made a purchase, some detail of the purchased good or service, the amount of the purchase, and so on. The biller may be an individual merchant, such as a retailer, utility service, mortgage company, and so on. The biller may be a payment processor such as MasterCard, Visa, Discover, and so on. The biller may be a private individual. The bill payment details may also identify transaction-specific data. For example, the bill payment details may indicate transaction information and SKU details for the purchased goods or services.

In an embodiment, the bill payment interface 152 may also present, in another area 152b, indicia 154 for one or more offers to purchase gift cards or pre-paid cards. A gift card is a certificate (usually presented as a gift) that entitles the recipient to purchase a merchant's goods/services of an indicated cash value. Such gift cards are issued by the merchant and may be referred to as "merchant gift cards" because the gift card can only be used to purchase goods/services from the issuing merchant. Bank-issued gift cards work much like merchant gift cards, serving as redeemable gift certificates that enable the user to purchase goods or services up to the value of the card and are not associated with a particular merchant and thus not restricted to making purchases with a particular merchant. Examples of bank-issued gift cards include prepaid Visa gift cards, MasterCard gift cards, and American Express gift cards. The gift cards may be branded by Visa, third parties, or co-branded between Visa and third parties.

Gift cards may also come in electronic form, usually as an alphanumeric code for making online purchases. A receiver of an electronic gift card may the use the gift card during online transactions, or may generate a physical copy of the gift card for use at physical stores. For example, an iTunes gift card 160 may be emailed to the first consumer 120. For the purposes of discussion, it will be understood that "gift card" may refer to either a physical tangible medium (e.g., a printed card or coupon) or an alphanumeric code.

In an embodiment, a gift card may be purchased via the bill pay system 150 by the consumer taking action (e.g., "clicking") on a gift card purchase indicium 154. For example, each of the indicia 154 may be a "click-able" button which, when clicked by the consumer, can initiate a sequence of actions relating to the purchase of the corresponding gift card.

Figure 2:
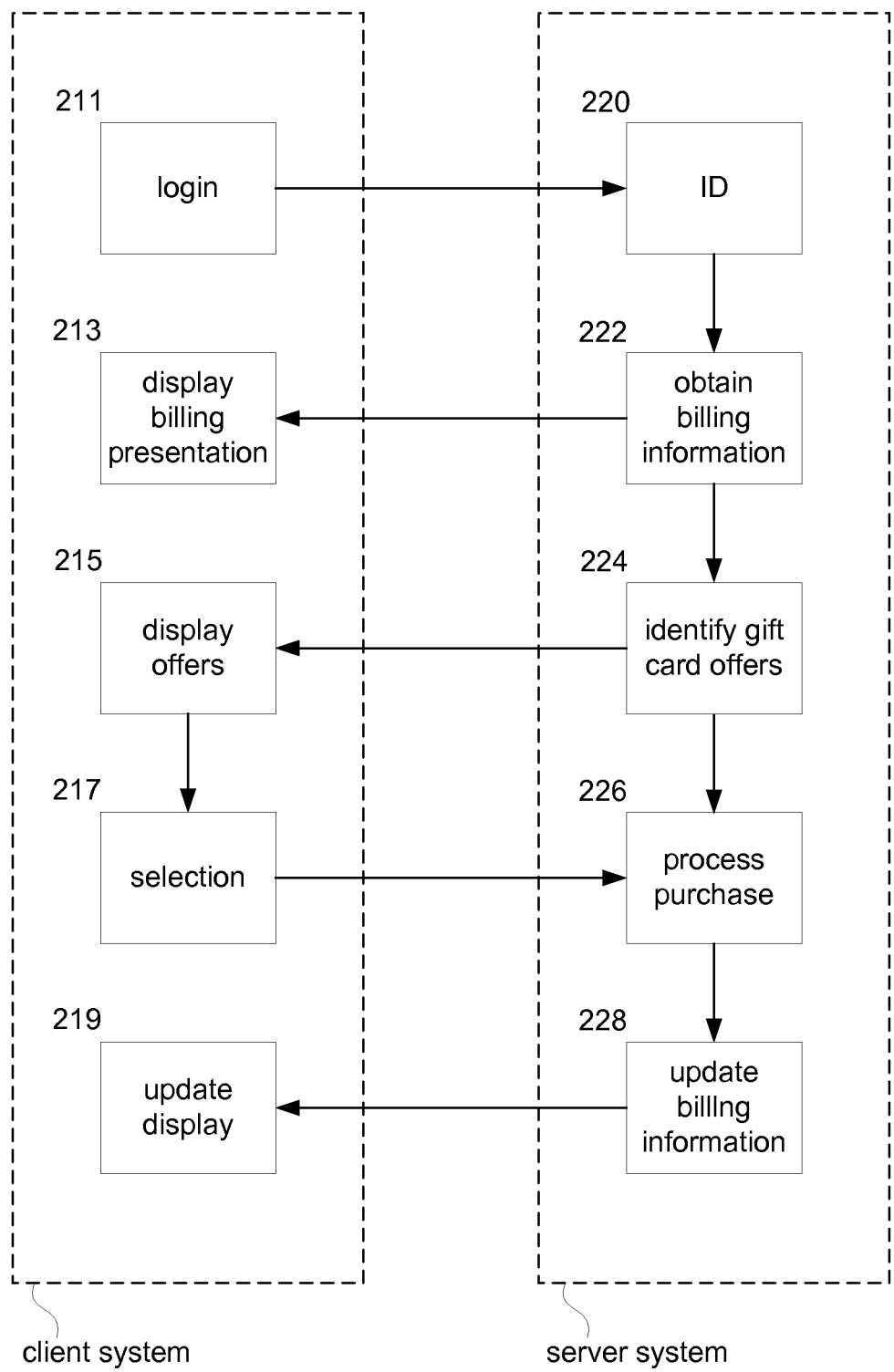
FIG. 2 shows an embodiment of client and server systems in accordance with the present invention.

Referring to FIGS. 1 and 2, gift card processing in accordance with the present invention will be described. A consumer 120 may use a web browser or other suitable software on his computer-based device (e.g., desktop or laptop computer, mobile device, and so on and referred to herein as the client system) to access the bill pay system 150. For example, the consumer 120 may enter a suitable URL (universal resource locator) of the bill pay system 150 into a web browser program executing on a computing device. The consumer 120 may run a special program (sometimes referred to as an applet) executing on a mobile device, such as a cellular phone which connects via the Internet to the bill pay system 150. For discussion purposes, "web browser" will be understood to include any kind of software that would be suitable for presenting a bill payment interface 152 to the consumer 120 in accordance with the present invention.

When the bill payment interface 152 is accessed, the consumer 120 may be presented with a login screen and be prompted to log into the bill pay system 150 (step 211). This may include the consumer 120 entering (e.g., typing on a keyboard, taping on a screen, or speaking) an identification and a password. Such login information may then be sent to a server computer system on which program components comprising the bill pay system 150 are executing (220).

Using the consumer's identification information, the bill pay system 150 may access billing information corresponding to the consumer 120 (step 222) and send at least some of that information to the client system. For example, the bill pay system 150 may access billing information stored in the data storage subsystem 142 which identifies merchants used in transactions with the consumer 120 for the current billing month. The information may then be sent to the client system, which may then present the information as a bill payment interface 152 that is displayed on a display device of the client system; e.g., a video display monitor (step 213). In an embodiment, the billing information for the current month may be displayed as bill payment details in area 152a of the bill payment interface 152.

In an embodiment, the bill pay system 150 may then generate one or more gift card purchase offers 154 based on the billing information for the logged in consumer 120 (step 222). For example, the bill pay system 150 may identify certain merchants from the billing information for the logged in consumer 120. The bill pay system 150 may then identify one or more corresponding gift card offers sponsored by those certain merchants. In an embodiment, information about gift card offers may be stored in the data storage subsystem 142. For example, if a consumer had entered into a transaction with Apple, Inc. during the current billing month, the bill pay system 150 may determine, as an appropriate offer, the sale of an Apple gift card. The sale price for the gift card, for example, may be $25 or $50, or any suitable denomination.

In another embodiment, the bill pay system 150 may have information (e.g., stored in the data storage subsystem 142) that identifies preferred merchants and generates one or more gift card offers for those preferred merchants. In yet another embodiment, the bill pay system 150 may have a database (e.g., stored in the data storage subsystem 142) of competing merchants who bid amongst each other to compete for being selected as sponsoring merchants for gift card offers. Generally, the bill pay system 150 determines, in some manner based on the billing information of the logged in consumer 120, one or more gift card offers to be presented in the bill payment interface 152.

When one or more gift card offers have been determined, the bill pay system 150 may send to the client computer information representative of the one or more gift card offers. The web browser executing on the client computer may then produce a suitable presentation on the display device of the client system of the one or more gift card offers 154 in area 152b on the bill payment interface 152 (step 215). In an embodiment, the presentation in area 152b may be displayed simultaneously with the bill payment details in area 152a. In another embodiment, the one or more gift card offers 154 may be presented using pop-up windows or other similar presentation techniques. For example, in an embodiment, a pop-up window can be made to appear when the consumer 120 mouse's over (move his cursor over) a merchant listed in the bill payment details. The pop-up window can include one or more offers for gift cards relating to the merchant that the consumer 120 had mouse'd over.

In an embodiment, the consumer 120 may interact in area 152a of the bill payment interface 152 (e.g., using a mouse input device and clicking on various elements on the bill payment interface) to make payments on items displayed in the bill payment details. The consumer 120 may interact in area 152b of the bill payment interface 152 to purchase a gift card by clicking, for example, on a display 154 of one of the offers of gift cards. The display 154 may be a link to the gift card offered to the consumer 120. The consumer 120 may send the link to a third party(ies) (e.g., friend, family member, etc.), thus forwarding the offer to the third party to purchase the gift card. The third party may then use well-known online transaction techniques for purchasing the gift card.

If the consumer 120 decides to purchase a gift card, he can click on a display 154 of the gift card offer of his choice (step 217). The web browser may then send information to the bill pay system 150 which may then initiate a purchase process (step 226) in the server system. The web browser may prompt the consumer 120 for information regarding the recipient of the gift card. Such information may include the recipient's name and a destination address. The web browser may also prompt for a message to accompany the recipient. The message may be included with the gift card, for example, "Happy Birthday!"; e.g., the message may be printed on the gift card.

In an embodiment, the destination address is an address of a physical location; e.g., a Home Depot gift card 162 may be sent to a house 170 of the first consumer 120 or the second consumer 180 via U.S. Mail. In an embodiment where the gift card is an electronic gift card, the destination address may be an electronic location such as an email address or a cell phone number for SMS (short message system) texting.

Processing a gift card purchase (step 226) may include the server system initiating the preparation and delivery of the selected gift card. In an embodiment where the gift card is a physical card, a card is prepared (manually or via automated processing equipment) which includes packaging the card in an envelope suitable for ground delivery. For example, the packaged gift card may be delivered to the recipient via U.S. Postal Service, or via a commercial courier delivery service. In an embodiment where the gift card is electronic, an alphanumeric code or other suitable electronic information may be emailed to the recipient or texted to the recipient. While the recipient may be a person other than the consumer 120, it will be appreciated that the recipient may very well be the consumer 120 himself.

In an embodiment, the server system may update the billing information of the consumer 120 when the consumer has made of purchase of a gift card (step 228). The billing information in the storage subsystem 142 may be updated to include the monetary value of the gift card that was just purchased. For example, if the gift card is a $25 gift for Apple's iTunes store, the billing information may be updated to indicate the purchase of an Apple iTunes gift card for a cost of $25.

Figure 1A:
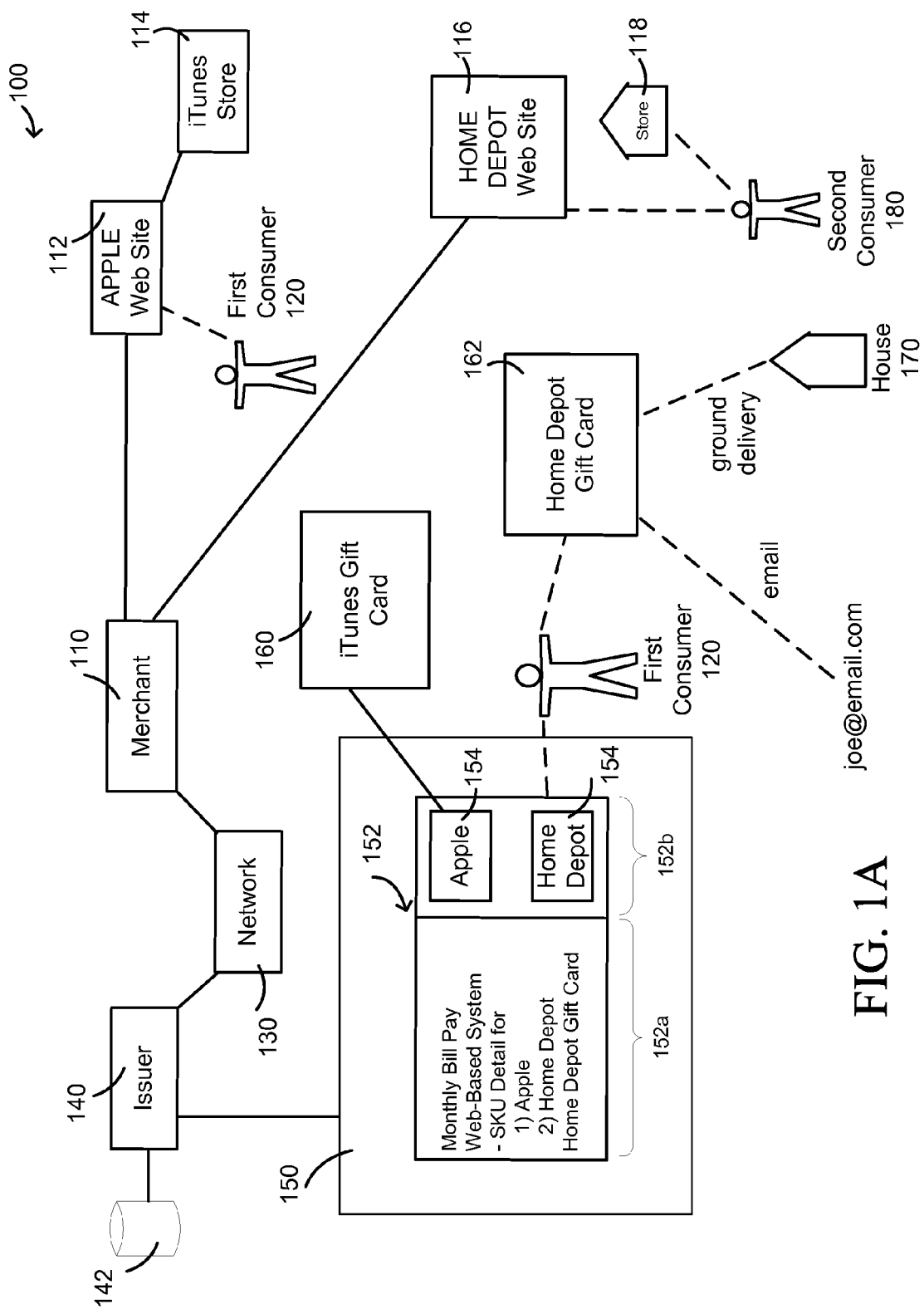

The server system may then send updated billing information to the client system to reflect the purchase of the gift card (step 219). For example, the bill payment details in the display area 152a may be updated right away to show the purchase of the gift card. The bill payment interface 152 in FIG. 1A illustrates a situation where the consumer purchases a Home Depot gift card; the bill payment details in area 152a is updated from FIG. 1 to include a line item for the Home Depot gift card that was just purchased.

Embodiments in accordance with the present invention present opportunities to increase the likelihood of gift card purchases, including issuer sponsored gift cards and merchant sponsored gift cards. Merchants may realize increased sales transactions due to the increase in distribution of gift cards.

Figure 3:
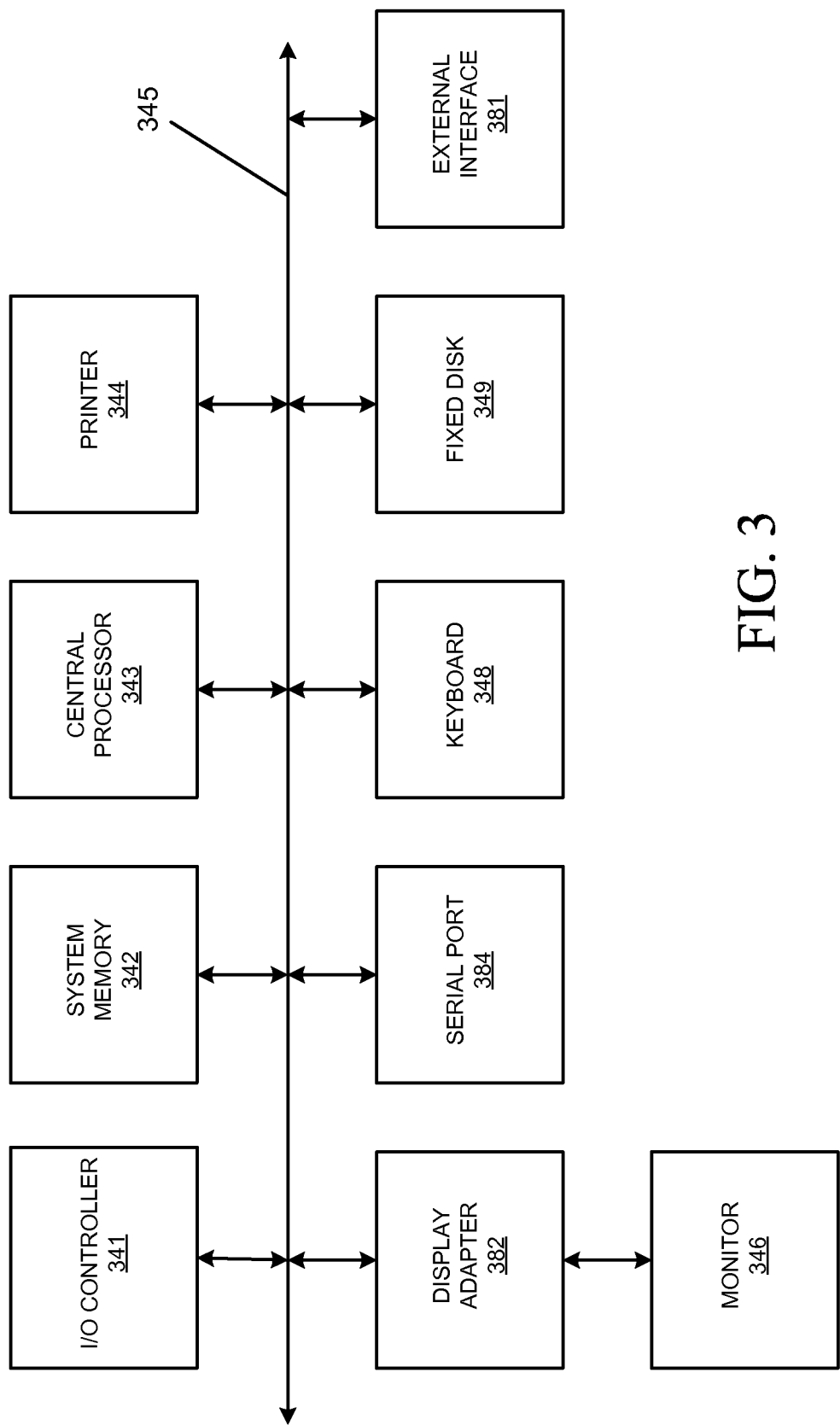
FIG. 3 is a high level block diagram of a computer system that may be used to implement a system for facilitating the purchase of gift cards according to an embodiment.

Any of the computer system entities or components described above may include one or more of the subsystems or components shown in FIG. 3, which is a block diagram of a computer apparatus. The subsystems shown in the figure are interconnected via a system bus 345. Additional subsystems such as a printer 344, keyboard 348, fixed disk 349, monitor 346, which is coupled to display adapter 342, and others are shown. Peripherals and input/output (I/O) devices, which couple to I/O controller 341, can be connected to the computer system by any number of means known in the art, such as serial port 384. For example, serial port 384 or external interface 381 can be used to connect the computer apparatus to a wide area network such as the Internet, a mouse input device, or a scanner. The interconnection via system bus allows the central processor 343 to communicate with each subsystem and to control the execution of instructions from system memory 342 or the fixed disk 349, as well as the exchange of information between subsystems. The system memory 342 and/or the fixed disk 349 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method of processing gift cards in a server computer system, the server computer system:
    receiving an identification of a consumer;
    sending data to a client computer system to display a bill payment interface in a first area of a display device of the client computer system, the bill payment interface including a representation of billing information pertaining to the consumer, the billing information including information that identifies one or more billers;
    sending data to the client computer system to display one or more gift card offers on the display device, each gift card offer being an offer to purchase a gift card;
    wherein the one or more gift card offers that are displayed on the display device are based on the billing information pertaining to the consumer;
    receiving data relating to a purchase of a gift card associated with the one or more gift card offers; and
    updating the billing information to include information indicative of a purchase transaction associated with the purchase of the gift card.

2. The method of claim 1 further including the server computer system initiating sending of the gift card to a recipient in response to the purchase.

3. The method of claim 2 further including the server computer system receiving destination information relating to the recipient.

4. The method of claim 2 wherein the gift card is sent by a ground-based delivery service to the recipient.

5. The method of claim 2 wherein the gift card is sent electronically to the recipient.

6. The method of claim 1 wherein the one or more gift card offers are displayed in a second area of the display device.

7. The method of claim 1 wherein the billing information further includes goods/services information that identifies goods/services purchased by the consumer, wherein one or more of the gift cards that are offered are based on the goods/services information.

8. The method of claim 1 wherein the billing information further includes merchant identification information that identifies one or more merchants, wherein at least one gift card is associated with a merchant sponsor that is a competitor of said one or more merchants.

9. The method of claim 8 wherein at least one gift card is further associated with a particular good or service offered by the merchant sponsor associated with said at least one gift card.

10. The method of claim 8 wherein at least one gift card is further associated with a monetary value and is suitable for making a purchase with only the merchant sponsor that is associated with said at least one gift card.

11. A computer system comprising a data processing subsystem and a system memory having stored therein computer program code that is executable by the data processing subsystem, wherein when the data processing subsystem executes the computer program code, the data processing subsystem performs the steps of claim 1.

12. The computer system of claim 11 further comprising a disk storage subsystem having stored therein the billing information.

13. A tangible computer readable storage medium, the computer readable storage medium having stored thereon computer program code configured to cause a computer system to perform the steps of claim 1.

14. A method for offering gift cards comprising:
    a first computing device sending data to a second computing device to display a bill payment interface in a first area of a display device, the bill payment interface comprising a display of billing information of a first consumer;
    the first computing device sending data to the second computing device to display one or more gift card offers in a second area of the display device, the one or more gift card offers being determined based on the billing information;
    the first computing device receiving data relating to purchase of a gift card associated with a first gift card offer;
    initiating sending of the gift card associated with the first gift card offer; and
    updating the billing information to including information indicative of a purchase transaction associated with the purchase of the gift card.

15. The method of claim 14 further comprising displaying in the bill payment interface a representation indicative of the purchase transaction.

16. The method of claim 14 further comprising receiving destination information for a recipient of the gift card.

17. A computer system comprising a data processing subsystem and a system memory having stored therein computer program code that is executable by the data processing subsystem, wherein when the data processing subsystem executes the computer program code, the data processing subsystem performs the steps of claim 14.

18. A tangible computer readable storage medium, the computer readable storage medium having stored thereon computer program code configured to cause a computer system to perform the steps of claim 14.

19. The method of claim 14 wherein the billing information further includes merchant identification information that identifies one or more merchants, wherein the gift card is associated with a merchant sponsor that is a competitor of said one or more merchants.

20. The method of claim 14 wherein the billing information further includes goods/services information that identifies goods/services purchased by the consumer, wherein the one or more gift cards offers are based on the goods/services information.

21. A client system for bill payment comprising:
data storage for an identifier to identify a user;
a display device;
a bill payment details component that outputs a bill payment display on the display device, the bill payment display including a first presentation of information indicative of billing information associated with purchases made by the user and a second presentation of information indicative of one or more offers to purchase gift cards; and
a gift card purchasing component that, in response to input from the user, initiates a purchase transaction with a server system to purchase a selected gift card, sends destination information to the server system which identifies a destination of a recipient of the selected gift card, and displays in the first display area information indicative of purchase of the selected gift card,
wherein the one or more offers to purchase gift cards are determined based at least on the purchases made by the user,
wherein the bill payment details component updates the billing information to include information indicative of the purchase transaction associated with the selected gift card.

22. The client system of claim 21 wherein the first presentation of information is displayed concurrently with the second presentation of information.

23. The client system of claim 21 wherein the first presentation of information is displayed in a first display area of the bill payment display and the second presentation of information is displayed in a second display area of the bill payment display.

24. The client system of claim 21 wherein the gift card purchasing component further prompts the user for the destination information and receives from the user the destination information.

25. The method of claim 21 wherein the billing information further includes merchant identification information that identifies one or more merchants, wherein the gift card is associated with a merchant sponsor that is a competitor of said one or more merchants.

26. The method of claim 21 wherein the billing information further includes goods/services information that identifies goods/services purchased by the consumer, wherein the one or more offers to purchase gift cards are based on the goods/services information.

* * * * *